United States Patent
Ibaraki

(10) Patent No.: US 8,092,574 B2
(45) Date of Patent: Jan. 10, 2012

(54) METHOD OF PRODUCING REDUCED IRON CAST, AND METHOD OF PRODUCING PIG IRON

(75) Inventor: Tetsuharu Ibaraki, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 12/676,047

(22) PCT Filed: Sep. 2, 2008

(86) PCT No.: PCT/JP2008/065768
§ 371 (c)(1),
(2), (4) Date: Mar. 2, 2010

(87) PCT Pub. No.: WO2009/031537
PCT Pub. Date: Mar. 12, 2009

(65) Prior Publication Data
US 2010/0199806 A1      Aug. 12, 2010

(30) Foreign Application Priority Data

Sep. 5, 2007  (JP) ................ P2007-230193
Aug. 27, 2008 (JP) ................ P2008-218015

(51) Int. Cl.
*C21B 11/06* (2006.01)
*C22B 1/216* (2006.01)

(52) U.S. Cl. ............ 75/484; 75/472; 75/504; 75/770

(58) Field of Classification Search .......... 75/484, 75/770, 504, 472
See application file for complete search history.

(56) References Cited

U.S. PATENT DOCUMENTS

| | | | |
|---|---|---|---|
| 4,033,559 A | 7/1977 | Pietsch | |
| 4,934,665 A | 6/1990 | Hoffken et al. | |
| 5,547,357 A | 8/1996 | Bergendahl | |
| 6,302,938 B1 | 10/2001 | Kamijo et al. | |

(Continued)

FOREIGN PATENT DOCUMENTS

CA    2383860 A1    3/2001

(Continued)

OTHER PUBLICATIONS

Extended European Search Report dated Nov. 4, 2010 for corresponding European Application No. 08829382.4.

(Continued)

*Primary Examiner* — George Wyszomierski
*Assistant Examiner* — Tima M McGuthry Banks
(74) *Attorney, Agent, or Firm* — Birch, Stewart, Kolasch & Birch, LLP

(57) ABSTRACT

In a method of producing a reduced iron cast, a cast of a powder which includes total iron of 40% or more and an atomic molar amount of fixed carbon of 0.7 to 1.5 times the atomic molar amount of oxygen compounded with metal oxide reduced in a carbon monoxide atmosphere at 1200° C. is reduced in a rotary hearth furnace. The method includes: producing, in an atmosphere at a maximum temperature of 1200° C. to 1420° C. at a ratio of carbon monoxide to carbon dioxide of 0.3 to 1.2 in the reduced zone, a reduced iron-containing material in which a ratio of metal iron is 50 mass % or more and a ratio of carbon is 5 mass % or less; and compression-molding the reduced iron-containing material at a temperature of 500° C. to 800° C. by a roller-type mold.

10 Claims, 1 Drawing Sheet

U.S. PATENT DOCUMENTS

| | | | |
|---|---|---|---|
| 6,986,801 B2 * | 1/2006 | Ibaraki et al. | 75/484 |
| 2001/0047698 A1 | 12/2001 | McClelland, Jr. et al. | |
| 2003/0019548 A1 | 1/2003 | Miyagawa et al. | |
| 2011/0023657 A1 * | 2/2011 | Ibaraki et al. | 75/369 |

FOREIGN PATENT DOCUMENTS

| | | |
|---|---|---|
| CA | 2427521 A1 | 4/2003 |
| CA | 2669796 A1 * | 5/2008 |
| CN | 1555419 A | 12/2004 |
| CN | 1563433 A | 1/2005 |
| EP | 0947586 A1 | 10/1999 |
| EP | 1340822 A1 | 9/2003 |
| GB | 2047751 A | 12/1980 |
| JP | 6-316718 A | 11/1994 |
| JP | 11-12627 A | 1/1999 |
| JP | 11-117010 A | 4/1999 |
| JP | 2001-303115 A | 10/2001 |
| JP | 2003-27149 A | 1/2003 |
| JP | 2004-218019 A | 8/2004 |
| RU | 2271396 C2 | 3/2006 |
| RU | 2293121 C2 | 2/2007 |

OTHER PUBLICATIONS

Russian Office Action (Decision on Grant) dated Jun. 1, 2011, in Russian Application No. 2010107663/02.

Kurunov I.F. et al, "State and aspects of iron metallurgy without blast furnace", Chermetinformatsiya, 2002, pp. 80-81.

Chinese Office Action dated Apr. 29, 2011, in Chinese Application No. 200880105460.3.

International Search Repot PCT/ISA/210, mailed Dec. 16, 2008.

Canadian Office Action dated Aug. 8, 2011, for Canadian Application No. 2,698,234.

* cited by examiner

METHOD OF PRODUCING REDUCED IRON CAST, AND METHOD OF PRODUCING PIG IRON

This application is the national phase of PCT International Application No. PCT/JP2008/065768 filed on Sep. 2, 2008, which claims the benefit of JP 2007-230193 filed on Sep. 5, 2007 and JP 2008-218015 filed on Aug. 27, 2008. The entire contents of all of the above applications are hereby incorporated by reference.

TECHNICAL FIELD

The present invention relates to a method of producing a reduced iron cast, including: producing a reduced iron-containing material by reducing a powder including oxidized iron and carbon with the use of a rotary hearth furnace; and hot-molding the reduced iron-containing material. In addition, the invention relates to a method of producing pig iron, including: molding partially-reduced iron produced by the rotary hearth furnace; and reducing and melting the partially-reduced iron in a blast furnace to produce hot metal.

The present application is based on Japanese Patent Application No. 2007-230193 and Japanese Patent Application No. 2008-218015, the entire contents of which are incorporated herein.

BACKGROUND ART

There are various metal reduction processes of producing reduced iron and alloy iron, and among the processes, the operation of a rotary hearth furnace (hereinafter, referred to as the RHF) is performed as a process having good productivity with low cost. For example, a brief outline of the process is described in Patent Document 1. FIG. 1 shows a cross-section in a diameter direction of the rotary hearth furnace. As shown in FIG. 1, the RHF is a baking furnace of a rotary type (hereinafter, referred to as the rotary furnace) in which, under a fixed refractory ceiling 1 and side walls 2, a disk-shaped refractory hearth 4 with a hollow center portion mounted on wheels 3 rotates on a rail 5 drawing a round circle at a uniform rate. The side walls 2 have a plurality of burners 6 installed therein. Fuel and air are injected from the burners to control an atmosphere gas component and a temperature in the furnace. Generally, a diameter of the hearth of the rotary furnace is in the range of 10 m to 50 m and a width thereof is in the range of 2 m to 8 m. A cast of powder including oxidized metal and carbon, corresponding to a raw material, is supplied onto the hearth 4 and heated by radiation heat from gas of an upper portion in the furnace. By the reaction of the oxidized metal and the carbon in the cast, metal is obtained in the cast.

FIG. 2 shows an example of the whole equipment of the RHF. For a raw material, oxidized metal such as an ore powder and oxidized metal dust and carbon acting as a reductant are used. In producing reduced iron, fine iron ore such as pellet feed or a by-product such as converter dust, sintered dust and blast furnace gas dust obtained from an iron-making process is used as an oxidized iron source. Coke, oil coke, coal or the like is used as the carbon acting as the reductant. It is preferable that the carbon acting as the reductant has a high carbon content (fixed carbon) that is not volatilized up to a temperature of about 1100° C. at which reduction reaction occurs. Such a carbon source is coke breeze or anthracite.

First, in a ball mill 11 which is a mixing device of FIG. 2, a powder including oxidized metal and a powder including carbon are mixed and then the mixture is molded to be granulated by a granulator 12. The resulting cast is supplied so as to be uniformly spread on the hearth 4 of a rotary furnace 13. In the rotary furnace 13, the cast moves through the portions in the furnace while the hearth 4 rotates. The cast is heated to 1000° C. to 1500° C. by hot gas radiation so that the carbon in the cast reduces the oxidized metal. Exhaust gas generated in the furnace passes through an exhaust gas duct 14 and is subjected to heat recovery by a boiler 15 and a heat exchanger 16. Then, after being subjected to dust removal by a dust collector 17, the gas is discharged to the air from a chimney 18. In the rotary furnace 13, the cast stands on the hearth 4 and thus there is an advantage that the cast is difficult to be broken in the furnace. As a result, there is a merit that a problem caused due to the adhesion of the powderized raw material to refractory does not occur. In addition, there is also an advantage that coal-based reductant and a powder raw material which are inexpensive and have high productivity can be used. A metallization ratio of reduced iron produced in this manner is 93% or less, and the reduced iron is slightly low in reduction degree as compared with direct-reduced iron (DRI: Directly Reduced Iron) produced by a gas reduction such as a MIDREX method.

For example, as described in Patent Document 2, there is also a method of producing high-strength reduced iron. The high-strength reduced iron is supplied together with lump ore or sintered ore to a blast furnace to produce pig iron. In this method, pre-reduced oxidized iron is finally reduced and molten in the blast furnace and thus heat load of the blast furnace is reduced. Accordingly, there are effects on reduction of coke source unit of the blast furnace and on increase of a pig iron producing amount.

Meanwhile, the DRI produced by the gas reduction such as the MIDREX method, which is a method of producing oxidized iron other than the RHF, has high porosity, and as a result, reoxidation of the metal iron easily occurs as a problem. In order to solve the problem, the DRI is hot-molded by a device shown in FIG. 3 as described in, for example, Patent Document 3 and Patent Document 4. In this molding method, a powdery or granular raw material largely including reduced iron is left to a relatively high temperature of 1000° C. or lower and the reduced iron supplied from a raw material chute 21 is sandwiched in between a pair of rollers 23 having recessed molds 22 to produce reduced iron casts 24 (hot briquette iron (HBI)). The reduced iron casts 24 are cooled up to a room temperature in a water-cooling device 25. In the hot briquette method, since the metal iron is pressed to be molded, it is preferable that a ratio of the metal iron in the DRI is high in order to produce suitable casts. Generally, DRI particularly having a high iron metallization ratio is molded and a ratio of metal iron in a raw material is in the range of 90% to 98%. When the ratio of metal iron is set as described above, a high-strength cast can be produced without a particular molding technique.

The HBI (reduced iron cast) has high density and is characterized in that inside thereof has few pores. Accordingly, the HBI is difficult to reoxidize and has high loading density and thus long-term storage or transport thereof can be performed. In addition, due to a dense structure thereof, there is an advantage that a melting rate in a melting furnace such as a steel-making electric furnace is high. Currently, hot briquette equipment is installed in many reduced iron plants. In usage thereof, the HBI is used as a reduced iron raw material in a vertical melting furnace or a steel-making electric furnace as in a method described in Patent Document 5.

[Patent Document 1] Japanese Unexamined Patent Application, First Publication No. 2001-303115
[Patent Document 2] Japanese Unexamined Patent Application, First Publication No. 2004-218019

[Patent Document 3] U.S. Pat. No. 4,934,665
[Patent Document 4] U.S. Pat. No. 5,547,357
[Patent Document 5] Japanese Unexamined Patent Application, First Publication No. H11-117010

DISCLOSURE OF THE INVENTION

Problems to be Solved by the Invention

Since reduced iron produced in a RHF is processed at a higher temperature than reduced iron produced by a MIDREX method or the like, high density can be achieved by sintering metal iron. As a result, there is an advantage that reoxidation is difficult to perform. When being produced by the method and the like described in, for example, Patent Document 2, the reduced iron is not completely reoxidized in open air for about 1 month. However, when the reduced iron is stored for a long period of time of 3 months or more (particularly, when the reduced iron is wet with continuous rain), the reduced iron is considerably reoxidized. As a result, problems that the value of the reduced iron as a product is lowered and that the temperature of the reduced iron increases due to the heat generation occurring together with the reoxidation occur.

Accordingly, in the past, the reduced iron produced by the RHF has been supplied to adjacent blast furnaces, converters, steel-making electric furnaces and the like in general, but has not been transported to remote ironworks by ship or stored for a long period of time. However, it attracts attention that by producing the reduced iron to be produced by the MIDREX method or the like near ore diggings or in sites of ore ports, an effect that the ore with enhanced added value is shipped is aimed. In order that the reduced iron produced by the RFH also may have a chemical characteristic to be easily transported over long distances as above, it is required not to provide conventional un-molded reduced iron as it is but to provide HBI.

The reduced iron produced by the RHF has characteristics as follows, but does not have a property to be necessarily suitable for a hot briquette method. First, since the reduction degree of the oxidized iron (including nickel oxide and the like) is low and the carbon as a reductant includes ash, the reduced iron more largely includes oxide impurities ($SiO_2$, $CaO$, $Al_2O_3$ and the like) than the reduced iron produced by another method. As a result, the content of the metal iron included therein is low, specifically, in the range of about 40 mass % to 75 mass % in general. Next, the carbon used for reduction is not completely consumed and remains as a carbon powder or carburized carbon (melting in iron) in the cast including the reduced iron. The remaining carbon powder becomes a cause for inhibiting pressure-bonding of the metal iron during compression-molding. Ductibility of the carburized iron is deteriorated and thus pressure-bonding performance of the metal iron is lowered.

The reduced iron produced by the RHF has characteristics as follows, but does not have a property to be easily subjected to hot briquette process. In addition, a method of hot-molding such reduced iron largely including components other than the metal iron is not yet sufficiently studied. Accordingly, a new technique for overcoming shortcomings of the above-described prior arts is required.

In the past, there has been a technique using reduced iron such as HBI in a dedicated melting furnace or steel-making electric furnace, as in the method described in Patent Document 5. However, in this method, there was a problem that equipment cost for the melting furnace and operation cost increased. Moreover, when the steel-making electric furnace was used, there was a problem such as power source unit increase of the electric furnace occurring by effects of unreduced oxidized iron. Accordingly, as described above, it was preferable that the reduced iron be used in a blast furnace. However, in the techniques described in Patent Document 2 and the like, since the amount thereof used in the blast furnace was small, a problem when the reduced iron was used was not recognized and it was only simply thought that it was preferable to supply the reduced iron to the blast furnace so as to be molten. As a result, operation conditions for proper reducing and melting have not been found. In this manner, there was a problem that the proper conditions when the reduced iron or HBI is used in the blast furnace were not found. In addition, the distribution of the most suitable reduction rate in the RHF and the blast furnace in a method of producing molten iron by the combination of both the furnaces was not sufficiently analyzed. As a result, the most suitable energy consumption in both the furnaces was not realized.

As described above, the technique of hot-molding the reduced iron produced in the RHF is not yet completed so as to be used for the blast furnace. Accordingly, a new technique for solving the problem is required.

Means for Solving the Problems

The invention is contrived to solve the technical problems when the reduced iron-containing material produced by the above-described RHF is hot-molded and details thereof are described in the following (1) to (12).

(1) In a method of producing a reduced iron cast (hot briquette iron, HBI), a cast of a powder which includes total iron of 40% or more and an atomic molar amount of fixed carbon of 0.7 to 1.5 times the atomic molar amount of oxygen compounded with metal oxide reduced in a carbon monoxide atmosphere at 1200° C. is reduced in a rotary hearth furnace. The method includes: producing, in an atmosphere at a maximum temperature of 1200° C. to 1420° C. at a ratio of carbon monoxide to carbon dioxide of 0.3 to 1.2 in the reduced zone, a reduced iron-containing material in which a ratio of metal iron is 50 mass % or more and a ratio of carbon is 5 mass % or less; and compression-molding the reduced iron-containing material at a temperature of 500° C. to 800° C. by a roller-type mold.

(2) In the method of (1), the reduced iron-containing material in which a carbon content of the contained metal iron is 2 mass % or less may be compression-molded. That is, by properly setting raw material blending and operation conditions of a RHF, a carbon content of the metal iron in the reduced iron-containing material may be set to 2 mass % or less, and by hot compression-molding the reduced iron-containing material, a reduced iron cast may be produced.

(3) In the method of (2), when an average furnace temperature of 1200° C. or higher is represented by T (K), time over which the cast of the powder stays in a portion at 1200° C. in the rotary hearth furnace may be not more than maximum carburization time t obtained by $t=0.13*\exp(7800/T)$, where t: time (minute) for gas temperature of 1200° C. or higher and T: average temperature in furnace (K) of 1200° C. or higher. That is, in order to suppress carburization to the metal iron, in the method according to (2), the time over which the cast of the powder stays in a portion at 1200° C. in the rotary hearth furnace may be not more than the maximum carburization time ($t=0.13*\exp(7800/T)$).

(4) In the method of (1), the reduced iron-containing material containing the iron particles having an average particle diameter of 70 µm or less or the sintered iron particles having an average particle diameter of 70 µm or less may be compression-molded.

(5) In the method of (1), a mass ratio of calcium oxide to silicon oxide in the cast of the powder including carbon and oxidized iron may be 2.2 or less. That is, in the operation of (1), by setting a mass ratio of calcium oxide to silicon oxide in the cast of the powder including carbon and oxidized iron to 2.2 or less, the oxide in the furnace may be prevented from being molten or softened and a reduced iron-containing material having good moldability may be produced.

(6) In the method of (1), the relationship of contents of magnesium oxide, calcium oxide and silicon oxide and the total iron in the oxidized iron in the cast of the powder including carbon and oxidized iron may be set to {(CaO mass %)−(MgO mass %)}/(T.Fe mass %)<0.1 and {(CaO mass %)−(MgO mass %)}/(SiO$_2$ mass %)<2.0. That is, in the operation of (1), by setting the relationship of contents of magnesium oxide, calcium oxide and silicon oxide and the total iron in the oxidized iron in the cast of the powder including carbon and oxidized iron to {(CaO mass %)−(MgO mass %)}/(T.Fe mass %)<0.1 and {(CaO mass %)−(MgO mass %)}/(SiO$_2$ mass %)<2.0, the oxide in the furnace may be prevented from being molten or softened and a reduced iron-containing material having good moldability may be produced.

(7) In the method of (1), the reduced iron-containing material including 5 mass % to 30 mass % of oxide and having a bulk density of 1.4 g/cm$^3$ to 2.8 g/cm$^3$ may be compression-molded.

(8) A method of producing pig iron may include supplying a reduced iron cast produced by the method of (1) to an iron making blast furnace to produce molten iron. That is, in the RHF, the cast of the powder which includes total iron of 40% or more and an atomic molar amount of carbon of 0.7 to 1.5 times the atomic molar amount of oxygen compounded with metal oxide reduced in a carbon monoxide atmosphere at 1200° C., such as iron, manganese, nickel, chrome, lead and zinc, is reduced at a maximum temperature of 1200° C. to 1420° C. in an atmosphere at a ratio of carbon monoxide to carbon dioxide of 0.3 to 1.1 in a reduction zone. With theses conditions, a reduced iron-containing material in which a ratio of metal iron is 50 mass % or more and a ratio of carbon is 5 mass % or less is produced. The reduced iron-containing material is compression-molded by a roller-type mold to produce a reduced iron cast. Further, it is supplied to an iron making blast furnace together with lump ore, sintered ore, baked pellets and the like to produce molten iron.

(9) In the method of (8), a reduced iron-containing material having a metal iron ratio of 50 mass % or more and a carbon ratio of 5 mass % or less may be produced; and a reduced iron cast which is produced by compression-molding the reduced iron-containing material with a roller-type mold and has a conversion diameter of 7 mm to 45 mm and an apparent density of 4.2 g/cm$^3$ to 5.8 g/cm$^3$ may be supplied to the iron making blast furnace to produce the molten iron. That is, in the method of (8), a reduced iron-containing material having a metal iron ratio of 50 mass % or more and a carbon ratio of 5 mass % or less is produced, and a reduced iron cast which is produced by compression-molding the reduced iron-containing material with a roller-type mold and has a conversion diameter of 7 mm to 45 mm and an apparent density of 4.2 g/cm$^3$ to 5.8 g/cm$^3$ is supplied to the iron making blast furnace to produce the molten iron. The conversion diameter is defined by a value of one third power of the volume of the reduced iron cast.

(10) In the method of (8), the reduced iron cast may be supplied to the iron making blast furnace at a ratio of 150 kg or less per 1 ton of hot metal to produce the molten iron.

(11) In the method of (8), the reduced iron cast of 65% or more may be supplied at a position within two third of the diameter from a furnace center of the iron making blast furnace to produce the molten iron.

(12) In the method of (8), the reduced iron-containing material having an iron metallization ratio of 55% to 85% may be produced in the rotary hearth furnace; and a reduced iron cast produced by hot compression-molding the reduced iron-containing material may be put in the iron making blast furnace to produce the molten iron. That is, in the method of (8), the reduced iron-containing material having an iron metallization ratio of 55% to 85% is produced in the RHF, and the reduced iron-containing material is hot compression-molded to produce a reduced iron cast. It may be supplied to the iron making blast furnace to produce the molten iron.

Advantages of the Invention

When the invention is used, oxidized iron powders and oxidized iron-containing dusts recovered from steel-making facilities can be properly reduced and hot-molded and thus reduced iron casts (hot briquette iron) having an appropriate shape can be produced. Further, the reduced iron casts which are produced by a RHF and a hot-molding device and have an appropriate shape have a property to be rarely reoxidized and can be stored for a long period of time and transported over long distances. By supplying the reduced iron casts to a blast furnace with proper conditions, the coke source unit in the blast furnace can be reduced and the pig iron production amount per hour can be increased.

Figure 1:
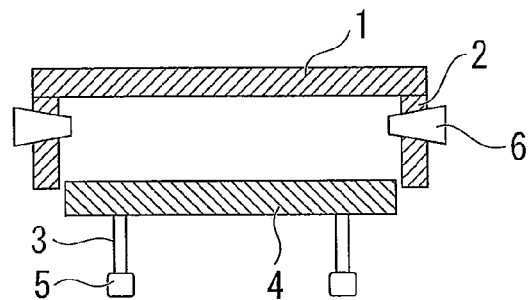
FIG. 1 is a diagram showing the structure of a rotary hearth furnace.

| [Description of Reference Numerals and Signs] | |
|---|---|
| 1: | CEILING |
| 2: | SIDE WALL |
| 3: | WHEEL |
| 4: | HEARTH |
| 5: | RAIL |
| 6: | BURNER |
| 11: | BALL MILL |
| 12: | GRANULATOR |
| 13: | ROTARY FURNACE |
| 14: | EXHAUST GAS DUCT |
| 15: | BOILER |
| 16: | HEAT EXCHANGER |
| 17: | DUST COLLECTOR |
| 18: | CHIMNEY |
| 21: | RAW MATERIAL CHUTE |
| 22: | RECESSED MOLD |
| 23: | ROLLER |
| 24: | REDUCED IRON CAST |

BEST MODE FOR CARRYING OUT THE INVENTION

Hereinafter, embodiments of a method of producing a reduced iron cast and a method of producing pig iron according to the invention will be described.

In this embodiment, a power including oxidized iron and carbon is used as a raw material. The oxidized iron may be any one of ferrous oxide (wustite, FeO), ferrous ferric oxide (magnetite, $Fe_3O_4$), ferric oxide (hematite, $Fe_2O_3$) and a mixture thereof. In addition, a metal iron powder may be mixed therein. As an oxidized iron source, ores such as iron ore or iron sand or oxidized iron-containing dust generated in ironworks or the like is used. As a carbon source, coke breeze, powdery coal, petroleum coke or the like is used. Since fixed carbon (FC) which is not volatilized even at a temperature not lower than 1000° C. contributes to reduction reaction, it is preferable that a ratio of the fixed carbon is high. From such a viewpoint, it is preferable to use coke breeze, petroleum coke, anthracite, medium-volatile fine coal or the like. Moreover, dust largely including a carbon content obtained in iron making also may be used.

In the raw material, impurities such as iron ore, oxidized iron-containing dust, coke and coal are mixed therein. These are metal oxides which are easily reduced, such as nickel oxide, manganese oxide, chrome oxide and zinc oxide and metal oxides which are not easily reduced, such as silicon oxide, calcium oxide, aluminum oxide, magnesium oxide and titanium oxide. It is preferable that, except for the carbon source, a total iron content (total iron (T.Fe) content) in the powder is 40% or more. When the total iron is 40% or less, a ratio of metal iron after reduction may become 50% or less and thus conditions for preferably performing a hot briquette process may not be satisfied. Herein, the total iron content is a value obtained by dividing the sum of a metal iron amount and an iron content in oxidized iron by a total powder amount.

A powder having an average particle diameter of 100 microns or less is used as the raw material. When the average particle diameter is 100 microns or more, mass transfer inside particles becomes slow and thus time for reduction becomes too long. Therefore, it is not preferable to use particles of 100 microns or more. In addition, in a granulation operation, a cast is easily produced as the particle diameter is small. From such a viewpoint, it is preferable to use fine particles.

The raw material is blended with a proper ratio of the oxidized iron and the carbon in the raw material. The reaction in a RHF is MO+C=M+CO and $MO+CO=M+CO_2$, where M is a symbol representing a metal element. The inventors have examined the reaction in the RHF and the results thereof are as follows. The metal which is reduced by carbon monoxide at 1300° C., such as iron oxide, nickel oxide, manganese oxide, chrome oxide and zinc oxide, is metalized in the RHF. A metallization ratio thereof is determined by RHF operation conditions and the like. On the other hand, the metal which is not reduced by carbon monoxide at 1300° C., such as silicon oxide, calcium oxide, aluminum oxide, magnesium oxide and titanium oxide, is not reduced in the RHF and remains as an oxide.

A blended amount of the carbon is determined by a ratio of oxygen (hereinafter, referred to as the active oxygen) combined with the metal which is easily reduced, such as iron oxide, nickel oxide, manganese oxide, chrome oxide and zinc oxide. Since the reduction reaction of iron oxide and the like occurs at the time when the temperature is higher than about 1000° C., the carbon contributing to the reduction reaction is the fixed carbon. Accordingly, it can be shown that suitable reaction occurs in the RHF when a ratio of the active oxygen and the fixed carbon is adjusted. A condition thereof is that a ratio (C/O) of an atomic molar amount of the fixed carbon to an atomic molar amount of the active oxygen is in the range of 0.7 to 1.5. When the C/O is 0.7 or less, regardless of reduction conditions in the RHF, reduction is not sufficiently performed due to the insufficient carbon and thus the metallization ratio of the iron is 55% or less in many cases. In this condition, the ratio of metal iron after reduction is 50% or less and thus conditions for preferably performing the hot briquette process are not satisfied. In addition, when the C/O is 1.5 or more, an excessive amount of carbon is blended in the reduction reaction and thus a large amount of carbon, which is about 5 mass % per a reduced product, remains after the reduction. This carbon interferes with the contact of iron particles with each other in the hot briquette process and thus becomes a cause for inhibiting a molding process. Consequently, the C/O of 1.5 or more is avoided, which is a condition to generate residual carbon of 5 mass % or more.

A method of reducing the raw material by the RHF will be described using FIGS. 1 and 2. First, the raw material powder is mixed by a mixing device (ball mill 11 of FIG. 2) and then a granular cast is produced by a granulator 12. The mixing device is not limited to the ball mill and may be a device of a kneader type, a fluidized bed type, an underwater mixing type or the like. The granulator includes a disk type granulator (pelletizer), a roller-type compression-molding device (briquetter), an extrusion type molding device and the like. The cast is supplied onto a hearth 4 of a rotary furnace 13 so as to be uniformly spread. It is preferable that the number of layers of the cast on the hearth 4 is not more than 2. This is a condition for preferably carrying out heat transfer. Regarding a size of the cast, it is preferable that an average diameter of spherical shapes is in the range of 8 mm to 20 mm and an average conversion diameter of other shapes is in the range of 7 mm to 22 mm. When the diameters are too small, a thickness of the cast on the hearth 4 is too thin and thus productivity is lowered. In addition, when the diameters are too large, there is a problem that heat transfer inside the cast is deteriorated. In the rotary furnace 13, the cast moves to a reduction zone from a heating zone while the hearth 4 rotates. The cast is heated to 1200° C. to 1420° C. by hot gas radiation in the reduction zone so that the carbon and the oxidized metal in the cast reacts with each other, thereby producing reduced iron. Staying time of the cast in the furnace is in the range of 10 minutes to 30 minutes and reduction time excluding heating time is in the range of 6 minutes to 25 minutes.

The reduced iron-containing material generated by this reaction has a reduction ratio (removal rate of oxygen atom of reduced metal) of 65% to 90% and an iron metallization ratio of 55% to 85%. A ratio of metal iron of the reduced iron-containing material is 50 mass % or more and a ratio of carbon thereof is 5 mass % or less. The reason that a reduction temperature is 1200° C. or higher is that, when the reduction temperature is 1200° C. or lower, the reduction reaction of the oxidized iron is too slow, reaction time increases to 30 minutes or more, and thus the reduced iron cannot be produced with an industrially economic condition. Further, the reason that the reduction temperature is 1420° C. or lower is that, when the reduction temperature is 1420° C. or higher, a carburization phenomenon in which the remaining (mixed) carbon invades metal iron crystals is quickened even if the residual carbon after the reaction is 5 mass % or less, and thus a carburization ratio of the reduced iron is 2 mass % or more. When the carburization ratio is 2 mass % or more, a considerable amount of cementite ($Fe_3C$) exists in the iron particles and thus ductility of the iron is deteriorated at a temperature ranging from a room temperature to 800° C. Therefore, there is a problem that the iron particles are not stretched during the hot briquette process. Since the temperature in the furnace and the reaction time have an effect on the carburization mount, it is preferable that a relationship between an average temperature of a portion in which a gas temperature is 1200° C. or higher in the furnace and time over which the cast exists in the portion in which the gas temperature is 1200° C. or higher satisfies a relationship of an inequality obtained by a test performed by the inventors, that is, maximum carburization time t<0.13*exp (7800/T), when a ratio of the residual carbon and the metal iron in the reduced iron-containing material is in the range of 0.02:1 to 0.06:1 and the highest gas temperature in the furnace is 1420° C. or lower (where, t: time (minute) for gas temperature of 1200° C. or higher, T: average temperature in furnace (K) of 1200° C. or higher).

The structure of the reduced iron pellets produced by the method according to the invention is characterized in that a state in which the metal iron particles are properly dispersed in the mixture of iron oxide and other oxides is formed. Further, it is important that the carbon does not excessively exist in the metal iron. In some cases, a metal iron particle network is formed. Accordingly, the method according to the invention has an operational characteristic in that the reduction ratio is not too high, as compared with conventional production methods. Because of this, a weakly reductive atmosphere is formed in the reduction zone in the RHF furnace. When the atmosphere is strongly reductive, the reaction of carbon monoxide in gas and the oxidized iron proceeds with the reduction occurring by the reaction of the carbon and the oxidized iron, and thus the carbon easily remains in the reduced iron pellets. In this case, cementite is formed.

In a test performed by the inventors, it is preferable that a ratio of carbon monoxide to carbon dioxide ($CO/CO_2$ ratio) in the gas in the reduction zone is 1.2 or less and it is more preferable that the ratio is 1.0 or less. However, when the $CO/CO_2$ ratio is 0.3 or less, the reduction of the oxidized iron does not normally proceed. Herein, the reduction zone is a position in the furnace, in which a reduced iron pellet center temperature is 1000° C. or higher and the gas component is defined as an average value of an in-furnace space disposed away from the cast by 300 mm or more. In a space disposed away from the cast by 300 mm or less, there is a difference from the whole gas composition due to an effect of the carbon monoxide occurring by the reduction reaction of the oxidized iron. Accordingly, the gas composition in the space disposed away from the cast by 300 mm or less does not satisfy the definition of the gas composition in the invention.

A total amount of the oxidized iron included in the reduced iron-containing material produced by the RHF is determined by a mixing ratio of the impurities in the raw material and the reduction ratio of the iron (ratio of residual oxidized iron). When the impurities are largely included or when the metallization ratio of the iron is 85% or less, the unreduced oxidized iron remains in addition to the metal oxide which is not easily reduced as the impurities. For this reason, a total amount of the oxidized iron in the reduced iron-containing material is in the range of 5 mass % to 30 mass %. In this case, the oxide becomes a cause for inhibiting the adhesion and thus it is difficult to perform the hot briquette process. Therefore, as described above, the carbon content of the metal iron in the reduced iron-containing material is set to 2 mass % or less. Further, in order to most easily perform the hot briquette process, the reduced iron-containing material is those in which the iron particles are 70 μm or less or the iron particles are sintered network constituents.

An aspect of the residual oxide in the reduced pellets has effects on the structure and the density of the metal iron of the reduced iron-containing material. When the oxide has a low melting point and is molten or softened in the furnace, the oxide particles of the reduced iron-containing material after cooling are coarsened. As a result, the reduced iron particles and the oxide are separated from each other and thus the whole bound state of the reduced iron-containing material is deteriorated. As a result, a problem that the density of the reduced iron-containing material is lowered occurs. In the invention, a size of the oxide particles is controlled to be in the range of 5 microns to 100 microns. When the size is 5 microns or less, the oxide particles and the metal iron particles are separated from each other and thus the dense structure cannot be formed. In addition, when the size is 100 microns or more, the metal iron particles are introduced to the coarsened oxide particles and thus hot-moldability of the reduced iron-containing material is lowered. Herein, the size of the oxide is this size when existing solely by itself and is this particle diameter when being sintered.

In order to prevent this phenomenon and properly control the size of the oxide particles, it is preferable that the raw material has a chemical composition not to generate an oxide compound having a low melting point. The oxide having a low melting point includes calcium ferrite, calcium silicate and the like having impurities mixed therein. After examination of the chemical composition of the raw material not to generate the oxide having a low melting point, it is found that it is preferable to control a ratio of calcium oxide to iron oxide and a ratio of calcium oxide to silicon oxide. It addition, it is also found that magnesium oxide suppresses the generation of calcium ferrite or calcium silicate. By a test, it is found that it is preferable that a mass ratio of calcium oxide to silicon oxide is 2.2 or less as the condition that the oxide is not molten or softened at a temperature of 1200° C. to 1400° C. Further, it is found that it is preferable that index A {(CaO mass %)−(MgO mass %)}/(T.Fe mass %)<0.1 and that index B {(CaO mass %)−(MgO mass %)}/($SiO_2$ mass %)<2.0 for more improvement. Moreover, it is preferable to satisfy a condition of (F mass %)+0.4(Cl mass %)<0.25% since fluorine and chlorine are elements lowering the melting point of the oxide. Herein, the coefficient related to the concentration of the chlorine is used to consider a degree of effect on softening and an atomic weight difference of the chlorine. Particularly, when recycling of iron-making dust or the like is performed, limiting of the oxide compound becomes the important means.

The reduced iron-containing material produced by the above-described method is hot-molded (hot briquette process). The principle of a hot-molding method is the same as the general hot briquette method and the molding process is performed by a device shown in FIG. 3. Reduced iron (reduced iron-containing material of powdery and granular mixture) at a temperature of 500° C. to 800° C., supplied from a raw material chute 21, is sandwiched in between a pair of rollers 23 having recessed molds 22 to be compressed in the recessed molds 22 to thereby produce high-density reduced iron casts 24. The reduced iron casts 24 are cooled up to a room temperature in a water-cooling device 25. The powder remaining without being molded returns to the raw material chute 21 through a returning device while being not cooled.

Conditions for the molding in the invention is as follows. A temperature of the reduced iron-containing material supplied to the rollers 23 is in the range of 500° C. to 800° C. Particularly, it is preferable that the temperature is in the range of 500° C. to 650° C. In a test performed by the inventors, since the reduced iron at 500° C. or lower has low ductibility, the reduced iron is less mutually pressure-bonded during the compression-molding. Therefore, producing the reduced iron-containing material is not successfully performed and problems that strength thereof is insufficient and that a portion of the reduced iron-containing material is separated therefrom and is powderized are generated. Further, in the case of the reduced iron-containing material at 800° C. or higher produced by the RHF, a part of the oxide therein is softened and enters contact surfaces between metal iron particles and thus a problem that an adhesion effect thereof is reduced occurs. This is because, the reduced iron-containing material largely including metal oxide causes alkali metal chloride or oxide to form an inorganic composite with the metal oxide and has an effect of lowering a melting point thereof. In addition, when the temperature of the reduced iron is 800° C. or higher, a problem that the wearing of the recessed molds 22 becomes severe also occurs. These problems are improved by setting the temperature of the reduced iron-containing material to 650° C. or lower.

Since the temperature of the reduced iron-containing material discharged from the RHF is in the range of 1000° C. to 1200° C., first, the reduced iron-containing material is cooled to 500° C. to 800° C. It is preferable to form an atmosphere having a low oxygen concentration of 5 vol % or less by a method such as nitrogen mixing and to cool the reduced iron-containing material discharged from the RHF in this atmosphere, so that reoxidation does not occur during the cooling. When water is directly applied to the reduced iron-containing material for cooling, it is not preferable that hydrogen is generated due to the reduction of the water. Accordingly, a cooling method without using water is performed. As a device for cooling, it is preferable to use a device which can control an internal atmosphere, such as a rotary drum cooler for external water cooling.

The raw material for hot-molding in the invention is as follows. The reduced iron-containing material which includes 50 mass % or more of the metal iron and 5 mass % or less of the carbon is used. By various test performed by the inventors, it is shown that, when the reduced iron-containing material having 50 mass % or less of the metal iron is molded, the metal iron as a binder for the cast is deficient and thus the strength of the cast becomes insufficient.

Since the reduced iron-containing material produced by the RHF has many contained materials (impurities having no ductibility at the time of compression) other than the metal iron, the strength of the cast at the time of compression is difficult to exhibit. The inventors have found that a volume reduction rate of a massive reduced iron-containing material has a large effect on strength of a cast. In the massive reduced iron-containing material having a high volume reduction rate, even if the iron particles are unevenly distributed, the iron particles move to gaps between the mixed oxides during the compression and the gaps can be filled with the iron particles. As a result, in the reduced iron-containing material having high porosity, the strength of the reduced iron cast is easily exhibited. When unsatisfied molding conditions, such as the case where a total amount of the oxide is in the range of 5 mass % to 30 mass %, are given, it is preferable that the reduced iron-containing material is not dense. In addition, it is preferable that a bulk specific gravity is 3.0 g/cm$^3$ or less and it is more preferable that the bulk specific gravity is 2.8 g/cm$^3$ or less. When the bulk specific gravity of the reduced iron-containing material is reduced, a problem that the recessed molds 22 are not sufficiently filled with the reduced iron-containing material and the density of the reduced iron cast is lowered occurs. As a result, the strength of the reduced iron cast is reduced. This is determined by the value of the bulk specific gravity and the bulk specific gravity of 1.4 g/cm$^3$ or less is also an important condition. Herein, the bulk specific gravity is a value obtained by dividing the mass of a material filling a constant volume container by the volume of the container.

As described above, in such a reduced iron-containing material in which the total amount of the oxide is large, it is preferable that with respect to the metal iron, the carburized carbon in the reduced iron is 2 mass % or less. This is because few cementite (material having low ductibility) are detected in the iron particles having 2 mass % or less of the carbon content and the ductibility is largely maintained at 800° C. or less. As a result, the adhesion of the metal iron at the time of molding is improved.

Further, in order to set a preferable molding condition, the reduced iron-containing material includes a state in which the metal particles is 70 μm or less or a state in which the metal particles are sintered network constituents. This is because, when this condition is satisfied, a number of the fine iron particles exist in the reduced iron-containing material and thus a chance of binding the particles to each other at the time of compression-molding increases. As a result, high-density casts can be produced. Particularly, when a large amount of, specifically, 5 mass % to 30 mass % of the oxide having no ductibility at the time of compression is included, it is preferable to use the reduced iron-containing material including the iron particles based on this condition.

In the recessed molds 22, square or rectangular casts having a shape in which a center thereof in a thickness direction is raised are produced. Basically, the casts may have any size. However, they are produced not to be smaller than a size of 2 sides of 10 mm angle and a thickness of about 5 mm and not to be larger than a size of 2 sides of 40 mm and 120 mm and a thickness of about 25 mm so as to be used in a blast furnace. When being presented by a conversion diameter, a reduced iron cast of 7 mm to 45 mm is suitable for the blast furnace. Herein, the conversion diameter is defined by a value of one third power of the volume of the reduced iron cast.

It is preferable that the density of the reduced iron cast is 4.2 g/cm$^3$ or more in apparent density. This is because, when the reduced iron cast produced by the RHF is not more than this apparent density, the strength of the reduced iron cast is lowered and thus cannot be resistant to long-term storage or transport. In addition, the reason that this apparent density is lower than the apparent density of general HBI is that the reduced iron produced by the RHF largely includes the residual oxide and carbon lower in specific gravity than the metal iron. However, when the apparent density of the reduced iron cast for the blast furnace is too high, a problem is generated. That is, since the reduced iron cast according to the invention is not completely reduced, it is required to reduce the oxidized iron in the reduced iron cast in the blast furnace. In order to increase the reduction rate of the reduced iron cast in the blast furnace, it is preferable that the density thereof is not too high as a preferable condition for infiltration of gas into the reduced iron cast. In a test performed by the inventors, it is found that, when the apparent density of the reduced iron cast is 5.8 g/cm$^3$, the gas easily enters from pores and thus reduction easily proceeds. Moreover, it is also shown that, when the apparent density of the reduced iron cast is less than 5.0 g/cm$^3$, reduction more easily proceeds. Accordingly, when the reduced iron cast produced in the RHF is used in the blast furnace, it is preferable that the apparent density is in the range of 4.2 g/cm$^3$ to 5.8 g/cm$^3$ and it is more preferable that the apparent density is in the range of 4.2 g/cm$^3$ to 5.0 g/cm$^3$. Herein, the apparent density is a value obtained by dividing the mass of the cast by the volume of the cast.

The above-described reduced iron cast is reduced and molten in the blast furnace. Raw materials for the blast furnace, including an iron source such as the reduced iron cast according to the invention, lump ore, sintered ore, and baked pellets and metallurgical coke, are supplied to the blast furnace via a bell in an upper portion of the furnace. As described above, the reduced iron cast supplied to the blast furnace is obtained by compression-molding the reduced iron-containing material having a ratio of metal iron of 50 mass % or more and a ratio of carbon of 5 mass % or less. A conversion diameter thereof is in the range of 7 mm to 45 mm. In addition, it is preferable that an apparent density thereof is in the range of 4.2 g/cm$^3$ to 5.8 g/cm$^3$ and it is more preferable that the apparent density is in the range of 4.2 g/cm$^3$ to 5.0 g/cm$^3$. When the furnace is filled with the reduced iron cast having a conversion diameter of 7 mm or less in layers in addition to other materials, gas passage pressure loss of the filling materials increases and thus operation thereof is difficult to perform. Consequently, it must be avoided. Further, since the reduced iron cast having a conversion diameter of 45 mm or more is low in reduction rate and melting rate, the reduced iron cast in a solid state is fallen to a lower portion of the furnace. Therefore, a problem that the reaction in the lower portion of the furnace becomes inactive occurs. The condition of the apparent density is set as above due to the above-described reason.

Supply position of the reduced iron cast in the blast furnace is also an important technique. The inventors have found that it is preferable that the reduced iron cast of 65% or more is supplied at a position within two thirds of the diameter from a furnace center in a circle obtained when the blast furnace is viewed from the top. When the reduced iron cast is largely put into the peripheral side of the blast furnace, the reduced iron cast is more rapidly reduced and molten than the ore and the like and thus the fall speed of the filling materials (burden) at the periphery excessively increases. As a result, the ore at the periphery, which is slowly reduced, reaches the lower portion of the furnace while being not reduced. Therefore, a problem that the lower portion of the furnace is supercooled occurs. Further, when the reduced iron cast is largely supplied to the furnace center, effects including the acceleration of the gas flow at the center of the furnace and the promotion of the falling of the filling materials occur. This is because, since the reduced iron cast is not reduction-powderized, the gas pressure loss in the filling materials can be reduced and the fall speed of the reduced iron cast increases. As a result, the gas flow at the center is accelerated and a blast volume can increase. Moreover, the filling materials at the center are reduced in a short time. As a result, pig iron productivity (production t/d) in the blast furnace can be improved.

The amount of the above-described reduced iron cast to be supplied to an iron making blast furnace is set so as to be a ratio of 150 kg or less per 1 ton of hot metal and this set ratio becomes a preferable condition for improving the pig iron productivity of the blast furnace. Obviously, a larger amount may be put in the blast furnace. However, in this case, the position of a shaft fusion zone of the blast furnace is too low and thus the pig iron productivity-enhancing effect occurring by the putting of the reduced iron is reduced.

When the invention is embodied, in the RHF, it is preferable that the reduced iron-containing material having an iron metallization ratio of 55% to 85% is produced so that the reduced iron cast produced by hot-molding the reduced iron-containing material is reduced and molten in the blast furnace. In the RHF, the oxidized iron can be reduced at a high reduction rate in a short time. However, due to the characteristic of the process, carbon dioxide is mixed in the atmosphere gas in the furnace by a certain ratio. Accordingly, in order to achieve high reduction of an iron metallization ratio of 85% or more, it is required that the temperature in the furnace is 1420° C. or higher and that the residual carbon in the reduced iron-containing material after the reaction is 5 mass % or more. As a result, energy consumption increases by 30% to improve the iron metallization ratio from 80% to 90% and thus economical operation cannot be achieved. Accordingly, it is preferable that the iron metallization ratio is 85% or less and it is more preferable that the iron metallization ratio is 80% or less.

EXAMPLES

Figure 2:
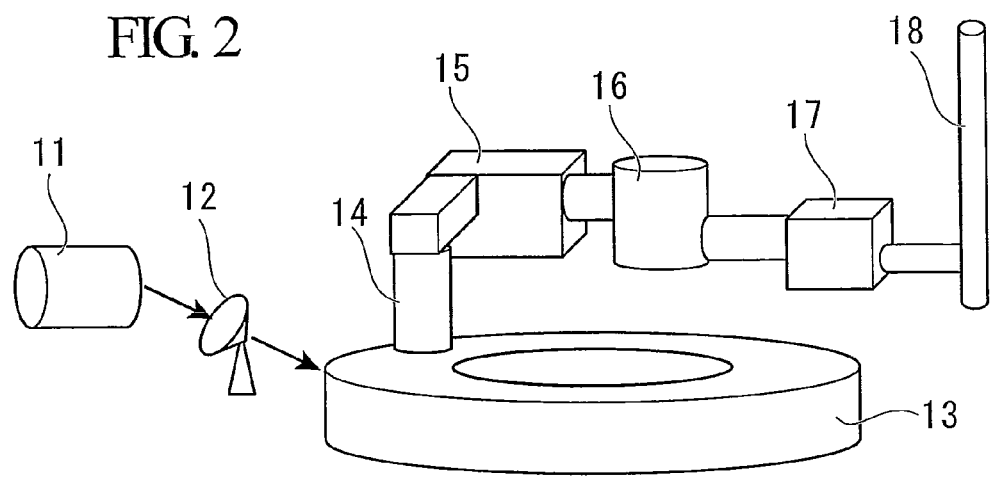
FIG. 2 is a diagram showing the whole treatment processes of the rotary hearth furnace.
Figure 3:
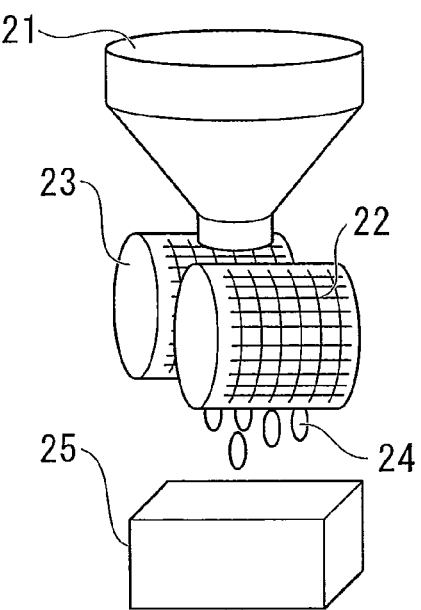
FIG. 3 is a diagram schematically showing a heat-molding device (hot briquette).

Using equipment in which the RHF equipment shown in FIG. 2 and the hot briquette device shown in FIG. 3 are connected to each other, oxidized iron reduction and molding processes were performed with different raw material conditions in accordance with the method according to the invention. The outer diameter of a hearth of the RHF was 24 m. The processing capabilities of the RHF and the hot briquette device were 24 ton/hour and 16 ton/hour, respectively. In addition, the reduced iron cast produced using the above equipments was supplied to a blast furnace of 4800 cubic meters and the operation results thereof were examined. These results are shown in Tables 1 to 3.

Properties of powders as raw materials are shown in Table 1. A raw material 1 is a by-product such as dust and sludge including oxidized iron recovered from a steel production process. Metal iron and ferrous oxide are included therein. In addition, oxidized metal and the like are largely included therein as impurities. Coke breeze (89 mass % of FC) is used as a carbon source. A raw material 2 is a mixture of a powder mainly including ferric oxide and anthracite (80 mass % of FC, 8 mass % of volatile). A raw material 3 is a mixture of a ferric oxide powder including ferrous ferric oxide (magnetite) and coke breeze (89 mass % of FC). A Fe oxidation degree (O/Fe) represents an element ratio of oxygen compounded with oxidized iron and T.Fe.

[Table 1]

TABLE 1

Raw material conditions

| | T.Fe % | Fe oxidation degree (O/Fe ratio) | MnO % | NiO$_2$ % | FC % | C/O | CaO/SiO$_2$ | Index A | Index B | F + 0.4 Cl | Average particle diameter μm |
|---|---|---|---|---|---|---|---|---|---|---|---|
| Raw material 1 | 52.2 | 1.05 | 0.75 | — | 13.6 | 1.15 | 1.8 | 0.07 | 1.6 | 0.08 | 52 |
| Raw material 2 | 56.7 | 1.42 | 0.11 | 0.08 | 14.0 | 0.81 | 2.1 | 0.03 | 1.7 | 0.07 | 38 |
| Raw material 3 | 61.4 | 1.33 | 0.12 | 0.05 | 16.2 | 0.92 | 0.8 | 0.08 | 0.6 | 0.11 | 68 |

RHF and hot-molding operation conditions and hot briquette iron production results are shown in Tables 2-1 and 2-2. All the raw materials as spherical pellets of an average 14 mm size were supplied to RHFs. A RHF 1 to a RHF 3 in Tables 2-1 and 2-2 are the results of RHF operations performed using the raw material 1 with various temperature conditions. The iron metallization ratio is in the range of 68% to 80%. The higher the gas temperature in a reduction zone, the higher the iron metallization ratio. In addition, the residual carbon ratio is lowered. Any ratio of carbon in iron was not higher than 1 mass %. The bulk density of casts was in the range of 1.8 to 2.3. This range was a proper range according to the invention. The casts were molded at a molding temperature of 510° C. to 650° C. so as to be briquettes having a size of a width of 12 mm, a length of 40 mm and a thickness of 7 mm. The casts had an apparent density of 4.5 g/cm³ to 5.3 g/cm³ and high strength of 10 MPa to 17 MPa. The strength was higher than a minimum of 7 MPa for the use in the blast furnace.

A RHF 4 is the results of an operation performed using the raw material 2 at a maximum temperature of 1350° C. for 20 minutes of processing time. The metallization ratio was 62% and the ratio of metal iron in the reduced iron-containing material was 56%. The reduced iron-containing material having a bulk specific gravity of 1.5 g/m³ was produced and molded at a molding temperature of 750° C. so as to be a large briquette having a size of a width of 40 mm, a length of 150 mm and a thickness of 25 mm. The suitable cast having an apparent density of 4.7 g/cm³ and strength of 12 MPa was produced.

RHF 5 and RHF 6 are the results of an operation performed using the raw material 3 at a reduction zone maximum temperature of 1300° C. for 12 minutes of processing time and an operation performed using the raw material 3 at a reduction zone maximum temperature of 1410° C. for 12 minutes of processing time. In the RHF 5, since the processing time is short and the gas temperature in a reduction zone is moderate, the metallization ratio was 59%, the ratio of metal iron in the reduced iron-containing material was 54%, and the metal iron was few. In the RHF 6, due to the suitable reduction conditions in addition to the processing time and the reduction zone temperature, the metallization ratio was 78% and the ratio of metal iron in the reduced iron-containing material was 75%. Since the raw material 3 having the average particle diameter of 68 microns was large in particle diameter, the reduction time thereof was longer than other raw materials. The raw material 3 was molded at molding temperatures of 550° C. and 600° C. so as to have a size of a width of 30 mm, a length of 120 mm, and a thickness of 20 mm. The casts were good in apparent density and strength. Particularly, in the RHF 6, the high-strength cast having strength of 18 MPa was produced. In any case of the RHFs 1 to 6, the average diameter of the iron particles of the reduced iron-containing material was in a suitable condition, specifically, 70 microns or less. In any operation condition, the staying time of the raw material casts at a portion of which a temperature was 1200° C. or higher was not longer than maximum carburization time. As a result, any carbon content of the metal iron was 2 mass % or less.

TABLE 2-1

RHF process conditions and results

| Type | Raw material | Total time minute | Time for 1200° C. or more minute | Reduction zone temperature ° C. | Reduction zone CO/CO₂ ratio | Maximum carburization time minute | Iron metallization ratio % | Metal iron ratio % | Residual carbon ratio % |
|---|---|---|---|---|---|---|---|---|---|
| RHF 1 | Raw material 1 | 15 | 8.3  | 1220 | 1.06 | 25 | 68 | 53 | 3.2 |
| RHF 2 | Raw material 1 | 15 | 12.3 | 1350 | 0.93 | 18 | 77 | 61 | 1.1 |
| RHF 3 | Raw material 1 | 15 | 12.8 | 1400 | 0.78 | 17 | 80 | 68 | 0.4 |
| RHF 4 | Raw material 2 | 20 | 15.8 | 1350 | 0.73 | 20 | 68 | 59 | 2.1 |
| RHF 5 | Raw material 3 | 14 | 11.2 | 1300 | 0.49 | 20 | 59 | 50 | 1.9 |
| RHF 6 | Raw material 3 | 20 | 15.5 | 1410 | 0.75 | 16 | 78 | 71 | 0.7 |

TABLE 2-2

RHF process conditions and results

| Type | Ratio of carbon in iron % | oxidized metal ratio % | Iron particle diameter μm | DRI bulk density g/cm³ | Molding temperature ° C. | Size of cast mm | Density of cast g/cm³ | Strength of cast MPa |
|---|---|---|---|---|---|---|---|---|
| RHF 1 | 0.82 | 43 | 32 | 1.8 | 555 | 12 * 40 * 7    | 4.5 | 10 |
| RHF 2 | 0.35 | 36 | 38 | 2.1 | 510 | 12 * 40 * 7    | 4.9 | 13 |
| RHF 3 | 0.15 | 30 | 38 | 2.3 | 650 | 12 * 40 * 7    | 5.3 | 17 |
| RHF 4 | 0.38 | 37 | 63 | 1.5 | 750 | 40 * 150 * 25  | 4.7 | 12 |
| RHF 5 | 0.55 | 45 | 26 | 2.3 | 600 | 30 * 120 * 20  | 4.4 | 10 |
| RHF 6 | 0.83 | 27 | 33 | 2.7 | 550 | 30 * 120 * 20  | 5.7 | 18 |

An evaluation on heat economy of the above-described reduction and melting in the blast furnace was performed for the reduction iron casts produced by the RHFS. In order to obtain comparative data, the operation results when a reduced iron cast is not used in the blast furnace are shown in a blast furnace 1. The reducing material ratio (coke+pulverized coal) was 503 kg/t-hm and the pig iron production amount was 10,058 ton/day. The results of the putting of the reduction iron casts with the same operation conditions are shown in blast furnaces 2 to 6 of Table 3. In the blast furnace 2, the cast of 55% was put at a position beyond two thirds from a furnace center of the blast furnace. Since this condition did not satisfy preferable conditions according to the invention in which the reduced iron cast is more largely put around the furnace center of the blast furnace, the reduction in reducing material per metal iron input amount and the increment in pig iron production were slightly small. In the blast furnace 3, the amount of the reduced iron cast supplied to the blast furnace was large, that is, 170 kg/t-hm, and thus this condition did not satisfy preferable conditions according to the invention. Accordingly, the reduction in reducing material per metal iron input amount and the increment in pig iron production were also slightly small. In the operations of the blast furnaces 4 to 6, since best conditions according to the invention were satisfied, the reduction ratio of the reducing material and the increment in pig iron production had very good results. However, in the blast furnace 6, since the HBI density was close to a maximum thereof, reduction was slightly slow.

large in energy consumption by 0.6 GJ/kg-Fe. That is, when the operation is performed using the combination of the RHF and the blast furnace with the proper condition of the above-described method according to the invention, the energy consumption can be reduced in comparison with conventional pig iron-making methods. The condition is that the metallization ratio of the iron in the RHF is in the range of 55% to 85%. When the metallization ratio is higher than this condition, the energy consumption in the RHF rapidly increases and thus exceeds the amount of energy consumption that can be saved in the blast furnace.

TABLE 3

Blast furnace operation results

| Type | Kind of input HBI | HBI-metal iron ratio % | HBI ratio kg/t-hm | Ratio of supply within one third from furnace center % | Reducing material ratio kg/t-hm | Reduction amount | Reduction in reducing material per metal iron kg/kg | Pig iron production t-hm/d | Increase amount | Production increase per metal iron (t-hm/d)/kg |
|---|---|---|---|---|---|---|---|---|---|---|
| Blast furnace 1 | — | — | 0 | — | 503 | | | 10,058 | | |
| Blast furnace 2 | RHF 2 | 61 | 40 | 55 | 493 | 10 | 0.41 | 10,209 | 151 | 6.9 |
| Blast furnace 3 | RHF 2 | 61 | 170 | 73 | 461 | 42 | 0.40 | 10,868 | 810 | 6.5 |
| Blast furnace 4 | RHF 4 | 59 | 85 | 80 | 480 | 23 | 0.46 | 10,570 | 512 | 7.5 |
| Blast furnace 5 | RHF 5 | 52 | 70 | 82 | 485 | 18 | 0.50 | 10,501 | 443 | 7.7 |
| Blast furnace 6 | RHF 6 | 75 | 70 | 82 | 483 | 20 | 0.37 | 10,444 | 386 | 6.7 |

The variation in amount of energy consumption of the blast furnace operation in the blast furnace 5 which was good in blast furnace operation and the used energy in the RHF having the conditions of the RHF 4 were compared to be evaluated on heat economy. Since the fuel energy unit (coke oven gas+carbon) in the RHF was 13.1 GJ/kg-Fe and the steam recovery energy and the power consumption energy in an installed boiler were almost offset, the energy consumption in the RHF was 13.1 GJ/kg-Fe. 0.85 kg of T.Fe per 1 kg of the reduced iron cast in the blast furnace was calculated from the variation in pig iron production amount in the blast furnace of Table 3 and the pig iron of 0.59 kg of the metal iron in the T.Fe was generated without almost energy increment. The amount of 0.26 kg required a normal blast furnace consumption energy result value (14.8 GJ/kg-Fe). Accordingly, the blast furnace consumption energy is 3.8 GJ/kg-Fe. As a result, the total energy consumption in the RHF and the blast furnace was 16.9 GJ/kg-Fe.

In the process of the combination of the sintering equipment and the blast furnace, the amount of energy consumption of the sintering equipment was 1.9 GJ/kg-Fe and the operation was performed at a sintering rate of 80%. When blast furnace consumption energy of 14.8 GJ/kg-Fe was applied to the sintering equipment, total energy consumption was 16.7 GJ/kg-Fe. Accordingly, with the operation conditions of the RHF 4, the amount of energy consumption in the combination of the RHF and the blast furnace and the amount of energy consumption in the combination of the sintering equipment and the blast furnace were almost the same. However, in view of the coke production energy in the amount of coke consumption (pig iron of 350 kg/ton) in the combination of the sintering equipment and the blast furnace, the combination of the sintering equipment and the blast furnace was

INDUSTRIAL APPLICABILITY

When the invention is used, oxidized iron powders and oxidized iron-containing dusts recovered from steel-making facilities can be properly reduced and hot-molded and thus reduced iron casts (hot briquette iron) having an appropriate shape can be produced. Further, the reduced iron casts which are produced by a RHF and a hot-molding device and have an appropriate shape have a property to be rarely reoxidized and can be stored for a long period of time and transported over long distances. By supplying the reduced iron casts to a blast furnace with proper conditions, the coke source unit in the blast furnace can be reduced and the pig iron production amount per hour can be increased.

The invention claimed is:
1. A method of producing pig iron, comprising:
reducing a cast of a powder which includes total iron of 40% or more and an atomic molar amount of fixed carbon of 0.7 to 1.5 times the atomic molar amount of oxygen compounded with metal oxide reduced in a carbon monoxide atmosphere at 1200° C. in a rotary hearth furnace to produce a reduced iron-containing material having a metal iron ratio of 50 mass % or more and a carbon ratio of 5 mass % or less in an atmosphere at a maximum temperature of 1200° C. to 1420° C. at a ratio of carbon monoxide to carbon dioxide of 0.3 to 1.2 in the reduced zone, and
compression-molding the reduced iron-containing material with a roller-type mold at a temperature of 500° C. to 800° C. to produce a reduced iron cast having a conversion diameter of 7 mm to 45 mm and an apparent density of 4.2 g/cm$^3$ to 5.8 g/cm$^3$; and
supplying the reduced iron cast to the iron making blast furnace to produce the molten iron.

2. The method of producing pig iron according to claim 1, wherein the reduced iron cast is supplied to the iron making blast furnace at a ratio of 150 kg or less per 1 ton of hot metal to produce the molten iron.

3. The method of producing pig iron according to claim 1, wherein the reduced iron cast has a reduction ratio of 65% or more and is supplied at a position within two thirds of the diameter from a furnace center of the iron making blast furnace to produce the molten iron.

4. The method of producing pig iron according to claim 1, wherein the reduced iron-containing material has an iron metallization ratio of 55% to 85% and is produced in the rotary hearth furnace, and
wherein a reduced iron cast produced by hot compression-molding the reduced iron-containing material is put in the iron making blast furnace to produce the molten iron.

5. The method of producing pig iron according to claim 1, wherein the reduced iron-containing material in which a carbon content of the contained metal iron is 2 mass % or less is compression-molded.

6. The method of producing pig iron according to claim 5, wherein when an average furnace temperature of 1200° C. or higher is represented by T (K), time over which the cast of the powder stays in a portion at 1200° C. in the rotary hearth furnace is not more than maximum carburization time t obtained by $t=0.13*\exp(7800/T)$.

7. The method of producing pig iron according to claim 1, wherein the reduced iron-containing material contains iron particles having an average particle diameter of 70 μm or less or sintered iron particles having an average particle diameter of 70 μm or less and is compression-molded.

8. The method of producing pig iron according to claim 1, wherein a mass ratio of calcium oxide to silicon oxide in the cast of the powder including carbon and oxidized iron is 2.2 or less.

9. The method of producing pig iron according to claim 1, wherein, in the cast of the powder including carbon and oxidized iron, a relationship of contents of magnesium oxide, calcium oxide and silicon oxide and the total iron in the oxidized iron is set to $\{(CaO\ mass\ \%)-(MgO\ mass\ \%)\}/(total\ Fe\ mass\ \%)<0.1$ and $\{(CaO\ mass\ \%)-(MgO\ mass\ \%)\}/(SiO_2\ mass\ \%)<2.0$.

10. The method of producing pig iron according to claim 1, wherein the reduced iron-containing material including 5 mass % to 30 mass % of oxide and having a bulk density of 1.4 g/cm$^3$ to 2.8 g/cm$^3$ is compression-molded.

\* \* \* \* \*